(12) United States Patent  (10) Patent No.: US 7,966,927 B2
Yoakim et al.  (45) Date of Patent: Jun. 28, 2011

(54) STANDALONE DRINK DISPENSING MACHINE

(75) Inventors: Alfred Yoakim, St-Legier-La Chiesaz (CH); Matthieu Ozanne, Chessel (CH)

(73) Assignee: Nestec S.A., Vevey (CH)

( * ) Notice: Subject to any disclaimer, the term of this patent is extended or adjusted under 35 U.S.C. 154(b) by 740 days.

(21) Appl. No.: 11/864,326

(22) Filed: Sep. 28, 2007

(65) Prior Publication Data

US 2008/0092747 A1 Apr. 24, 2008

Related U.S. Application Data

(63) Continuation of application No. PCT/EP2006/002268, filed on Mar. 13, 2006.

(30) Foreign Application Priority Data

Mar. 29, 2005 (EP) .................................... 05102447

(51) Int. Cl.
*A47J 31/00* (2006.01)

(52) U.S. Cl. ........................... 99/284; 99/295; 99/302 R

(58) Field of Classification Search ............. 99/279, 99/284, 285, 295, 300, 302 R, 306, 307
See application file for complete search history.

(56) References Cited

U.S. PATENT DOCUMENTS

| 3,290,484 | A | | 12/1966 | Day .............................. 219/441 |
| 5,183,998 | A | * | 2/1993 | Hoffman et al. .............. 219/492 |
| 6,123,010 | A | | 9/2000 | Blackstone ...................... 99/284 |
| RE37,173 | E | * | 5/2001 | Jefferson et al. ................ 99/299 |
| 7,210,401 | B1 | * | 5/2007 | Rolfes et al. ................ 99/289 R |
| 7,644,649 | B2 | * | 1/2010 | Dworzak et al. ................ 99/279 |
| 2004/0149139 | A1 | * | 8/2004 | Kollep ............................ 99/279 |
| 2004/0255787 | A1 | * | 12/2004 | Lassota et al. ................. 99/275 |
| 2008/0041233 | A1 | * | 2/2008 | Bunn .............................. 99/281 |

FOREIGN PATENT DOCUMENTS

| EP | 1 440 905 B1 | 6/1995 |
| EP | 0 512 470 B1 | 4/1996 |
| EP | 0 512 468 B1 | 1/1997 |
| EP | 0 602 203 B1 | 4/1997 |
| EP | 1 277 428 B1 | 9/2005 |
| EP | 1 344 722 B1 | 11/2006 |
| WO | WO 03/059779 A2 | 7/2003 |

* cited by examiner

*Primary Examiner* — Reginald L Alexander
(74) *Attorney, Agent, or Firm* — Winston & Strawn LLP

(57) ABSTRACT

A machine for preparing and dispensing drinks by extraction under pressure of a food substance contained in a capsule which can function in a standalone mode in order to deliver several drinks successively. The machine includes an extraction module for receiving a capsule, a heat insulated water reservoir for supplying the extraction module, a pump and an electrical power supply that includes a low voltage electrical accumulator configured to supply the pump. The reservoir has a heating device that includes an electrical element powered by the accumulator.

Figure 1:
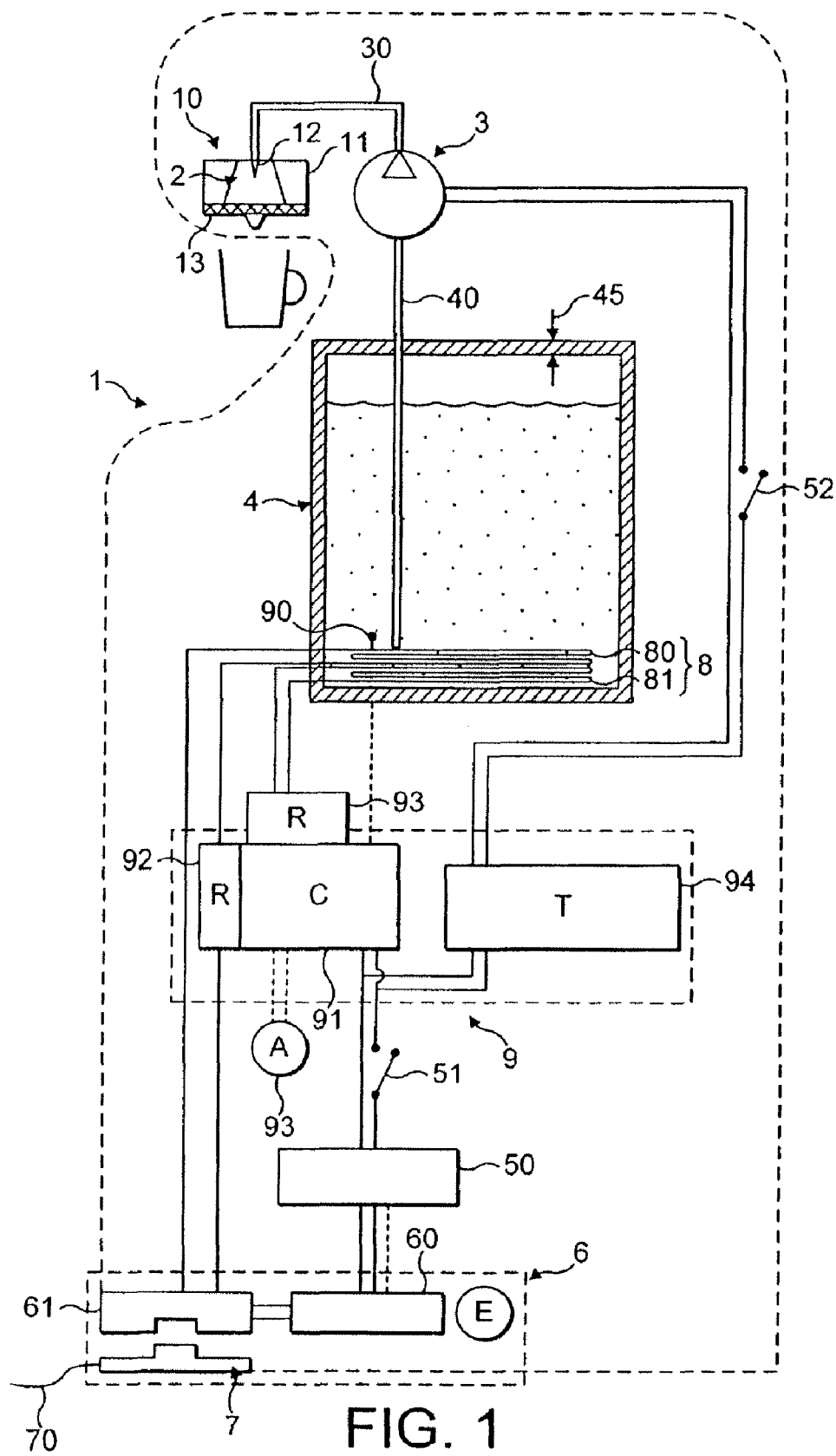

16 Claims, 1 Drawing Sheet ly provide a service in standalone or autonomous mode; that is to say which is designed to extract from capsules under pressure without necessitating a connection to the electrical power mains at the very moment of extraction. However, in order to deliver a coffee by extraction under pressure, fluid temperature and pressure conditions must be adequate.

STANDALONE DRINK DISPENSING MACHINE

CROSS-REFERENCE TO RELATED APPLICATIONS

This application is a continuation of International application PCT/EP2006/002268 filed Mar. 13, 2006, the entire content of which is expressly incorporated herein by reference thereto.

BACKGROUND

The present invention relates to a standalone machine for the preparation of drinks, or other similar products, by the extraction under pressure of a food substance contained in a capsule. The invention relates more precisely to mobile or portable coffee machines using extraction capsules.

Drink preparation machines, of the coffee machine type, which use packaged portions of food substance are rapidly becoming widespread in homes or even in communal premises, commercial places or companies. The preparation principle is based on the extraction of portions containing a food substance (ground coffee for example) by passing though this portion a quantity of cold or hot liquid under high pressure, typically a pressure several times higher than atmospheric pressure. The packaged portions can be partially rigid capsules or flexible sachets, sealed or partially open, or filter pods.

An example of a capsule is described in the European patent application EP 0 512 468 B1. An example of a sachet is described in the European patent application EP 0 602 203 B1. Other examples of capsules are described in PCT application WO 03/059778 and European patent applications EP 1 344 722 and EP 1 440 905.

Such extraction systems have many advantages. On the one hand, the individual packages are easy to use and do not require manual measuring of coffee or other produces into the machine. The user places a capsule, a pod of ground coffee or other portions in the machine, then presses a button to start the extraction. On the other hand, the individual packages are measured to deliver a drink, like a coffee, having the desired characteristics such as a certain strength or concentration of solids, a certain aromatic profile, a certain quantity of foam or other important attributes which characterize the drink. When the package is impermeable to gas and the coffee is kept in the package under a modified atmosphere, they retain their freshness attributes better, comparable to a freshly ground coffee, up until the actual moment of extraction. Finally, the preparation conditions, such as temperature, pressure and extraction time, can be controlled better; which provides the consumer with a relatively controlled and constant quality from one drink to another. An example of an extraction process is described in the European patent application EP 0 512 470 B1.

There is a need for a machine making it possible to provide a service in standalone or autonomous mode; that is to say which is designed to extract from capsules under pressure without necessitating a connection to the electrical power mains at the very moment of extraction. However, in order to deliver a coffee by extraction under pressure, fluid temperature and pressure conditions must be adequate.

Firstly, in order to extract from several capsules in succession, and to produce a quality drink, the temperature of the water, which passes through the capsule, must be sufficiently high, of the order of at least 90° C. for each extraction. This makes it necessary to heat the water, before it penetrates into the capsule, up to a temperature at least equal to the extraction temperature. The heating demands suitable heating means which generally consume a large amount of electrical power.

In order to deliver a drink under pressure, provision is generally made to heat a quantity of water in a circulating fluid or fast heating means such as a thermobloc and then routing this water at high pressure into the capsule; which demands a high instantaneous power in the traditional machines.

Secondly, the pressure of the fluid in the capsule must reach several bars, for example from 8 to 20 bars (of relative pressure), until the flowing of the drink. If the pressure is insufficient in the capsule, the capsule may not open if it is a capsule whose opening is related to pressure and/or the liquid cannot flow or it flows abnormally. This demands the use of a sufficiently powerful pump able to develop a static pressure of up to about 20 bars.

In an electrically autonomous ("standalone") mode, the low voltage electrical sources, like a portable or fixed battery, are not capable of simultaneously providing this heating and the regulation of the temperature of the water associated with it and, at the same time, the pumping of the water at a sufficient pressure. Their power is normally limited because of low amperage, in such a way also as to remain within a reasonable battery weight/size range (as with a lead battery for example). In fact, the weight/size of the battery depends on the technology used. The higher the amperage, the narrower is the choice of battery technology. For high amperages, the batteries are generally heavy and not very ecological.

Moreover, for a battery of low amperage, and therefore lighter and less bulky, they do not develop power sufficiently and their autonomy under high instantaneous power is therefore very low and they therefore discharge too quickly and would not therefore be able to ensure the production of several coffees in succession.

For example, it is thus observed that it is necessary to be able to call upon a mean instantaneous power of 1400 Watt (+/−200) and a power of at least 560 Watt per hour (+/−100) in order to heat the quantity of water in a circulating fluid or fast heating means. In order to deliver an average of about 100 coffees in two hours, this requires a battery of about 120 ampere-hours. The existing batteries of this amperage value are lead batteries; they are very heavy (several kilograms), bulky and polluting.

European patent application EP 1 277 428 A1 refers to a coffee machine for a vehicle designed to extract from coffee capsules under pressure and which has a reserve of cold water, a circulating fluid water heater of the high inertia thermobloc type for heating a restricted volume of water, a pump and an extraction module supplied by the pump and in which the extraction takes place. The pumping, heating and control means are powered by the current produced by the vehicle's battery, in general a 12 volt or 24 volt battery. In order to obtain the power sufficient for the extraction process, the principle is therefore to cut off the electrical power supply or at least to greatly reduce it before operating the pump. A disadvantage arises from the waiting time between two drinks; necessary in order to heat again in the water heater the quantity necessary for the next drink. Another disadvantage arises from the high electricity consumption of the water heater which tends to exhaust the battery quickly when the engine of the vehicle is stopped. Thus, improvements in these type devices are desired.

SUMMARY OF THE INVENTION

The present invention now overcomes the disadvantages of the prior art. More precisely, the invention proposes a solution to the problem of delivering, for the extraction of drinks from capsules, water at a sufficient temperature, preferably substantially constant, at a sufficiently high pressure, preferably substantially constant, for the extraction from several successive capsules in a standalone delivery mode; that is to say not necessitating connection of the machine to the electrical power supply mains, at the moment of pumping the water, during the extraction of the said drinks; whilst providing a device which is not heavy and/or bulky to move and which does not necessitate long recharging times.

The invention is thus based on a special architecture of a machine associated with a special management of electrical resources making it possible to cope with the high temperature and pressure requirements necessary for the extraction of a drink from the said capsules. For this purpose, the invention relates to: a standalone drink dispensing machine for delivering a drink by extraction under pressure from a capsule comprising:

an extraction module intended to receive a capsule, comprising means of injecting water under pressure into the capsule, means of receiving the capsule and, optionally, means of opening the said capsule in order to release the liquid extract of the drink starting from a certain pressure, a water reservoir for supplying the said module with water; the said reservoir being of sufficient capacity for successively supplying the said module for extraction from several capsules, a pump for drawing water from the reservoir and supplying the capsule with water under pressure in the extraction module, and electrical power supply means for heating the water in the reservoir up to a reserve temperature higher than or equal to the extraction temperature, and for supplying the pump electrically, The electrical power supply means advantageously comprises a low voltage electrical accumulator associated with the machine and configured to supply the pump with electrical current. Also, the reservoir comprises heating means comprising at least one electrical element and being configured to be supplied from the mains in order to heat the water up to a reserve temperature range and/or to be supplied from the electrical accumulator in order to compensate for the heat losses after heating up to the reserve temperature range. Furthermore, the reservoir is preferably surrounded by heat insulating walls in order to reduce the heat losses.

A general principle of the invention is therefore, in other words:

to use a low voltage current in standalone mode solely for powering the pump and, possibly, to compensate for the heat losses of a hot water reserve from such a source; whilst also preferably ensuring that these losses are limited by heat insulation of the reservoir, and to provide a hot water reserve which is no longer heated from the initial temperature up to the reserve temperature range by battery current in standalone mode but which is heated previously by a heating means powered by the mains.

The main advantages are therefore, in a standalone service mode, essentially:

ensuring optimal and reproducible conditions (temperature, pressure), greater standalone service capability and, no longer any waiting time related to reheating a volume of water between the preparation of two drinks.

In a preferred embodiment, the heating means comprise:

at least a first electrical element powered by the accumulator and, a temperature control device associated with a temperature sensor in the water reservoir; the said device being configured to act on the powering of the element in order to maintain the temperature within a substantially constant reserve temperature range.

The advantage of such a configuration is based on increasing the standalone service capability by maintaining the same temperature conditions during the extraction whilst reducing the electrical power consumption from the low voltage source as much as possible. Thus the pump and the first electrical element can be powered whilst functioning at the same time by the accumulator. The instantaneous power consumption of the pump and of the first element is such that, when functioning in conjunction, it is less than or equal to 100 Watt, and preferably between 50 and 80 (+/−5) Watt.

In the context of the invention, the term "accumulator" is used to define an electrical energy source able to function in standalone mode of the "battery" type, for supplying a low power, preferably less than or equal to 150 Watt, which can, after a certain exhaustion threshold, be either recharged or replaced by a new source.

In the context of the invention, a low voltage power supply refers to a power supply typically of 12 or 24 volts or any other particular voltage less than 100 volts. Similarly, a mains or medium voltage power supply refers to a power supply typically of 110-120 volts or 220-230 volts or any other specific voltage higher than 100 Volts and less than or equal to 340 volts.

Preferably, the heating means comprise a second electrical element able to be powered by the mains current in order to heat the water up to the reserve temperature range. The heating of the water to the reserve temperature range is preferably controlled by the temperature control device associated with a temperature sensor in the water reservoir; the said device being configured to act on the powering of the element until the reserve temperature is reached and then maintaining the reserve temperature.

In one embodiment of the invention, the heating means therefore comprise a first low power element powered by the low voltage current in order to compensate for the heat losses in the reservoir and a second higher power element powered by the medium voltage current of the mains for heating the water.

In one embodiment of the invention, the dispensing machine also comprises an electrical charging device associated with the accumulator in order to recharge the latter electrically. More particularly, the charging device comprises a power supply base and a power supply unit connected to the accumulator; the said unit being electrically connectable when the machine is put into the position of rest on the said base. The machine can be put into the position of rest simply by placing it on the base or by suspension by detachable hooking means, for example.

In one embodiment of the invention, the pump is a pump using medium voltage alternating current, for example 110 or 220 volts AC, and the machine comprises a low voltage DC/medium voltage AC converter for supplying the pump with medium voltage AC. The pump is therefore preferably an electromagnetic piston pump. Such a pump has the advantage of being able to develop a high maximum static pressure, of the order of 20 bars or more and in an economically advantageous manner. The pump is chosen to consume an instantaneous power of less than or equal to 100 Watt, preferably of about 60 Watt (+/−10).

According to a possible alternative, the pump is a pump which functions on a low voltage DC or AC current. The pump can then be an electromagnetic piston pump operating on low voltage AC, for example 12 or 24 volts. An electronic control must then be provided in order to convert the low voltage DC into a suitable AC signal current. In another even simpler embodiment, the pump is a gear pump which operates directly on low voltage DC. Similarly, an electronic control must be provided to control the pressure rise curve and the maximum pressure delivered by the pump.

BRIEF DESCRIPTION OF THE DRAWINGS FIGURES

The invention will be better understood with reference to the drawing figures, wherein:

FIG. 1 shows a block diagram according to a preferred embodiment of the machine according to the invention.

DETAILED DESCRIPTION OF THE PREFERRED EMBODIMENTS

The drink dispensing machine 1 according to the invention shown in FIG. 1 comprises an extraction module 10 in which can be received a capsule 2 containing a substance to be extracted. In general, the module has receiving means 11 consisting of a lower part and an upper part which are assembled by closing together in order to form an enclosure in which the capsule is housed. The module also has water injection means, like a water pipe associated in the enclosure with means 12 of piercing the capsule to allow the introduction of water into the capsule. The module has means 13 of opening the flowing face of the capsule; like points, pyramids or other relief and/or recessed elements on which the face of the capsule tears and/or is pierced in response to the rise in pressure inside the capsule and therefore allows the flow of the drink into the cup. These opening means could be supported in the capsule itself, instead of being in the module as in the patent application WO 03/059778. In one possible embodiment, the opening means are omitted and the capsule is pre-opened or pre-pierced before injection by mechanical piercing or other means, leaving the liquid to flow starting from a certain flowing pressure.

A pump 3 and a water reservoir 4 are provided in order to supply the module with water under pressure. Pipes 30, 40 connect the pump to the module and the reservoir to the pump respectively. The pipe 40 is extended inside the reservoir sufficiently deeply to pump down to a liquid level as low as possible.

The electrical powering principle of the machine 1 is as follows.

The machine comprises an electrical accumulator 50 producing a low voltage current (12 or 24 volts) recharged by an electrical recharging device 6 comprising a charger 60 and a power supply unit 61 which supplies the charger with mains current (110 or 220 volts). The accumulator can for example be a lithium or a lithium-cadmium battery. The mains power supply unit is connected in a detachable manner to a power supply base 7 fitted with a power supply lead 70 for being connected to the mains current such as to a wall socket. The power supply unit 61 and the power supply base 7 fit together in a complementary manner and in a way that is electrically and mechanically detachable. Such an assembly is known and does not require further description. It can for example be an electrical connection device such as sold by the "Strix" company or any other equivalent means. In one alternative, the blocks 60, 61 can be replaced by a simple electrical power supply connector associated with an electrical power lead.

The reservoir comprises heating means 8 consisting of a series of two elements 80, 81. A first element 80 is a high power element, preferably of between 800 and 3000 Watts (limits included) and even more preferably between 1500 and 2000 Watts (limits included), which is intended to heat the water inside the reservoir from a cold or ambient temperature up to a reserve temperature, substantially equal to or a few degrees higher than the desired extraction temperature. For example, a reserve temperature range for the extraction of coffee from capsules of ground coffee is preferably from 87 to 98° C., and more preferably from 89 to 92° C. This first element is supplied with medium voltage current (mains voltage) from the power supply unit 61 when the power supply unit is placed on the base 7, and the latter is connected to the mains current.

The temperature control in the reservoir is carried out by a control device 9 which comprises a temperature sensor 90 connected to the central controller 91 which acts on a relay 92 which selectively switches the power supply to the element 80 on or off. When the temperature of the water in the reservoir reaches a maximum temperature value pre-programmed in the central controller, the controller commands the opening of the relay to stop the power supply of the element. The relay is closed again when the measured temperature drops below a threshold temperature value; this re-establishes the heating in the element. In general, the temperature values, maximum and minimum (or threshold), are chosen not to be separated from each other by more than a few degrees (for example 1 or 2 degrees). A pre-heating light indicator 93 can be provided to light up when the relay is in the closed position and to turn off when the relay is in the open position. In this way, the user is informed of the heating status of the water inside the reservoir and knows when the machine is ready to be used in a standalone service mode.

The machine has a second, less powerful element 81, for example of the order of 20 to 150 Watts, preferably between 10 and 80 Watts, whose function is simply to compensate for or at least slow down heat losses when the machine is in the standalone service mode, that is to say when the power supply unit 61 is detached from the mains current power supply base 7. This second element is submerged in the reservoir and is powered by the electrical accumulator 50 with low voltage direct current (for example at 12 or 24 VDC). The temperature control in the reservoir, in this standalone service mode, is carried out in the same way by the control device 9 which comprises the said temperature sensor 90 connected to the central controller 91 which acts on a relay 93 which selectively switches the power supply of the element 81 on or off. The temperature range in which the switching of the relay takes place to ensure a substantially constant reserve temperature in this service mode is preferably narrow, of the order of 1 or 2 degrees Celsius.

According to one feature of the invention, the pump 3 is also powered by the accumulator 50 via a converter 94 which converts the medium voltage alternating current, (for example at 110 or 220 volts AC) into low voltage direct current (for example at 12 or 24 VDC).

The electrical circuit can be completed by two control buttons. A first button 51 is provided on the low voltage circuit between the accumulator and the control device; in order to start up the machine by closing the low voltage circuit. When this button is in the closed position, the control device 9 is then powered; which allows the heating means to be selectively activated by the relays 92, 93. A second button 52 is provided for activating the pump itself.

In order to limit the heat losses in the reservoir; and thus to limit the consumption of electrical energy taken from the accumulator and thus allow a greater standalone service capability, the reservoir is designed with heat insulating walls 45.

The expression "heat insulating walls" means: a wall whose insulation efficiency is such that the loss of temperature of the liquid in the reservoir is less than 10° per hour, preferably less than 6° C. per hour, for a starting temperature of 90° C.

The machine according to the invention is capable of delivering about 20 to 100 coffees in succession over a period of one to two hours without recharging the accumulator or connecting to the mains current.

The invention can of course include variants or diverse modifications within the scope of those skilled in the art.

What is claimed is:

1. A standalone drink dispensing machine for delivering a drink by extraction under pressure from a capsule comprising:
   an extraction module which is intended to receive a capsule and which comprises means of injecting water under pressure into the capsule and means of receiving the capsule,
   a water reservoir for supplying the said module with water; the said reservoir being of sufficient capacity for successively supplying the said module for extraction from several capsules,
   a pump for drawing water from the reservoir and supplying the capsule with water under pressure from the water injecting means of the extraction module,
   electrical power supply means for normally providing electrical power for heating the water in the reservoir up to a reserve temperature higher than or equal to the extraction temperature, and for supplying the pump electrically, and
   a low voltage electrical accumulator is configured to supply electrical current for heating the water in the reservoir when the electric power supply means is disconnected,
   wherein the reservoir comprises heating means, wherein the heating means comprises a first electrical element powered by the accumulator, and a second electrical element, independent of the first element, that is capable of initially being powered by current from the electrical power supply means and configured to be supplied with electrical power from the electrical power supply means in order to normally heat the water up to the reserve temperature, and the first electrical element is to be supplied with electrical power from the electrical accumulator when the electric power supply means is disconnected in order to compensate for the heat losses after heating up the water to the reserve temperature.

2. The dispensing machine according to claim 1, wherein the reservoir is surrounded by heat insulating walls in order to reduce the heat losses.

3. The dispensing machine according to claim 1, wherein the heating means comprises:
   a temperature control device associated with a temperature sensor in the water reservoir; with the device being configured to act on the powering of the element in order to maintain the reserve temperature within a substantially constant range of values.

4. The dispensing machine according to claim 3, wherein the pump and the first electrical element can be powered while functioning at the same time by the accumulator.

5. The dispensing machine according to claim 4, wherein the instantaneous power consumption of the pump and of the first element when functioning in conjunction is less than or equal to 100 Watts.

6. The dispensing machine according to claim 1, which further comprises an electrical charging device that can be coupled electrically to the accumulator in order to recharge the latter electrically.

7. The dispensing machine according to claim 6, wherein the charging device comprises a power supply base and a power supply unit connected to the accumulator; with the unit being able to be coupled electrically when the machine is put into the position of rest on the base.

8. The dispensing machine according to claim 1, wherein the pump is a piston pump or a gear pump.

9. The dispensing machine according to claim 1, wherein the capsule is a sealed capsule capable of receiving the water under pressure and including beverage forming ingredients therein such that the water combines with the beverage forming ingredients to form a beverage.

10. A standalone drink dispensing machine for delivering a drink by extraction under pressure from a capsule comprising:
    an extraction module which is intended to receive a capsule and which comprises means of injecting water under pressure into the capsule and means of receiving the capsule,
    a water reservoir for supplying the said module with water; the said reservoir being of sufficient capacity for successively supplying the said module for extraction from several capsules,
    a pump for drawing water from the reservoir and supplying the capsule with water under pressure in the extraction module,
    electrical power supply means for normally providing electrical power for heating the water in the reservoir up to a reserve temperature higher than or equal to the extraction temperature, and for supplying the pump electrically,
    a low voltage electrical accumulator that is configured to supply electrical current for heating the water in the reservoir when the electric power supply means is disconnected, and
    a converter for converting low voltage direct current into medium voltage alternating current and for supplying the pump with the medium voltage alternating current,
    wherein the reservoir comprises heating means comprising at least one electrical element; with the heating means configured to be supplied with electrical power from the electrical power supply means in order to normally heat the water up to the reserve temperature and to be supplied with electrical power from the electrical accumulator when the electric power supply means is disconnected in order to compensate for the heat losses after heating up the water to the reserve temperature.

11. The dispensing machine according to claim 10, wherein the capsule is a sealed capsule capable of receiving the water under pressure and including beverage forming ingredients therein such that the water combines with the beverage forming ingredients to form a beverage.

12. The dispensing machine according to claim 11, wherein the water injecting means comprises an injection pipe, the receiving means includes a lower part and an upper part which are assembled by closing together in order to form an enclosure in which the capsule is housed, and the extraction module includes means for opening a face of the capsule to allow the formed beverage to exit.

13. A standalone drink dispensing machine for delivering a drink by extraction under pressure from a capsule comprising:

an extraction module which is intended to receive a capsule and which comprises means of injecting water under pressure into the capsule and means of receiving the capsule, wherein the water injecting means comprises an injection pipe, the receiving means includes a lower part and an upper part which are assembled by closing together in order to form an enclosure in which the capsule is housed, and the extraction module includes means for opening a face of the capsule to allow a formed beverage to exit;

a water reservoir for supplying the said module with water; the said reservoir being of sufficient capacity for successively supplying the said module for extraction from several capsules and including heating means comprising at least one electrical element;

a pump for drawing water from the reservoir and supplying the capsule with water under pressure from the water injecting means of the extraction module;

electrical power supply means for initially providing electrical power to the heating means for heating the water in the reservoir up to a reserve temperature higher than or equal to the extraction temperature, and for supplying the pump electrically; and a low voltage electrical accumulator that is configured to supply electrical current to the heating means for heating the water in the reservoir when the electric power supply means is disconnected, wherein the heating means is initially supplied with electrical power from the electrical power supply means in order to heat the water up to the reserve temperature and is later supplied with electrical power from the electrical accumulator when the electric power supply means is disconnected in order to compensate for the heat losses after heating up the water to the reserve temperature so that the device can be used as a standalone device after the water is heated to the reserve temperature.

14. The dispensing machine according to claim 13, wherein the capsule is a sealed capsule capable of receiving the water under pressure and including beverage forming ingredients therein such that the water combines with the beverage forming ingredients to form the beverage.

15. A standalone drink dispensing machine for delivering a drink by extraction under pressure from a capsule comprising:

an extraction module which is intended to receive a capsule and which comprises means of injecting water under pressure into the capsule and means of receiving the capsule, wherein the water injecting means comprises an injection pipe, the receiving means includes a lower part and an upper part which are assembled by closing together in order to form an enclosure in which the capsule is housed, and the extraction module includes means for opening a face of the capsule to allow a formed beverage to exit;

a water reservoir for supplying the said module with water; the said reservoir being of sufficient capacity for successively supplying the said module for extraction from several capsules;

a pump for drawing water from the reservoir and supplying the capsule with water under pressure from the water injecting means of the extraction module;

electrical power supply means for normally providing electrical power for heating the water in the reservoir up to a reserve temperature higher than or equal to the extraction temperature, and for supplying the pump electrically; and a low voltage electrical accumulator is configured to supply electrical current for heating the water in the reservoir when the electric power supply means is disconnected, wherein the reservoir comprises heating means comprising at least one electrical element; with the heating means configured to be supplied with electrical power from the electrical power supply means in order to normally heat the water up to the reserve temperature and to be supplied with electrical power from the electrical accumulator when the electric power supply means is disconnected in order to compensate for the heat losses after heating up the water to the reserve temperature.

16. The dispensing machine according to claim 15, wherein the capsule is a sealed capsule capable of receiving the water under pressure and including beverage forming ingredients therein such that the water combines with the beverage forming ingredients to form the beverage.

* * * * *